US009665424B2

United States Patent
Fee et al.

(10) Patent No.: US 9,665,424 B2
(45) Date of Patent: *May 30, 2017

(54) RECOVERY IMPROVEMENT FOR QUIESCED SYSTEMS

(71) Applicant: International Business Machines Corporation, Armonk, NY (US)

(72) Inventors: Michael Fee, Cold Spring, NY (US); Ute Gaertner, Schoenaich (DE); Lisa C. Heller, Rhinebeck, NY (US); Frank Lehnert, Weil im Schoenbuch (DE); Jennifer A. Navarro, Poughkeepsie, NY (US); Rebecca S. Wisniewski, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 121 days.

This patent is subject to a terminal disclaimer.

(21) Appl. No.: 14/571,512

(22) Filed: Dec. 16, 2014

(65) Prior Publication Data

US 2016/0140002 A1 May 19, 2016

Related U.S. Application Data

(63) Continuation of application No. 14/542,764, filed on Nov. 17, 2014.

(51) Int. Cl.
*G06F 11/00* (2006.01)
*G06F 11/10* (2006.01)
(Continued)

(52) U.S. Cl.
CPC ...... *G06F 11/1064* (2013.01); *G06F 11/1044* (2013.01); *G06F 11/1402* (2013.01);
(Continued)

(58) Field of Classification Search
CPC ............ G06F 11/1064; G06F 11/1044; G06F 11/1402; G06F 11/1484; G06F 11/2028; G06F 11/2041
See application file for complete search history.

(56) References Cited

U.S. PATENT DOCUMENTS 5,903,763 A * 5/1999 Takahashi ............... G06F 15/17
710/200
6,493,741 B1 * 12/2002 Emer .................. G06F 9/30087
710/200
(Continued)

OTHER PUBLICATIONS

"Quiesce a Processor and Dynamically Redistribute the Assigned Processor Capacity to the Remaining Processors in a Processor Group", An IP.com Prior Art Database Technical Disclosure, Authors et. al.: Disclosed Anonymously, IP.com No. IPCOM000223140D, IP.com Electronic Publication: Nov. 5, 2012.
(Continued)

*Primary Examiner* — Esaw Abraham
(74) *Attorney, Agent, or Firm* — Isaac J. Gooshaw

(57) ABSTRACT

Methods and apparatuses for performing a quiesce operation during a processor recovery action is provided. A processor performs a processor recovery action. A processor retrieves a quiesce status of a computer system from a shared cache with a second processor. A processor determines a quiesce status of the first processor based, a least in part, on the retrieved quiesce status of the computer system.

7 Claims, 9 Drawing Sheets

(51) Int. Cl.
*G06F 11/14* (2006.01)
*G06F 11/20* (2006.01)
*G06F 12/084* (2016.01)
*G06F 12/0811* (2016.01)

(52) U.S. Cl.
CPC ...... *G06F 11/1484* (2013.01); *G06F 11/2028* (2013.01); *G06F 11/2041* (2013.01); *G06F 12/084* (2013.01); *G06F 12/0811* (2013.01); *G06F 2201/815* (2013.01); *G06F 2212/314* (2013.01)

(56) References Cited

U.S. PATENT DOCUMENTS

| | | | | |
|---|---|---|---|---|
| 6,675,316 | B1* | 1/2004 | Harper | G06F 11/203 711/135 |
| 6,772,321 | B2* | 8/2004 | Chaudhry | G06F 9/383 712/225 |
| 6,948,092 | B2* | 9/2005 | Kondo | G06F 11/1441 714/12 |
| 7,089,433 | B2* | 8/2006 | Chaiken | G06F 9/4418 713/300 |
| 7,200,626 | B1* | 4/2007 | Hoang | G06F 11/0751 |
| 7,379,418 | B2 | 5/2008 | Korb et al. | |
| 7,587,565 | B1* | 9/2009 | Bingham | G06F 11/1464 711/161 |
| 7,761,696 | B1* | 7/2010 | Bhattacharyya | G06F 13/4027 712/229 |
| 8,140,834 | B2* | 3/2012 | Heller | G06F 9/4812 712/228 |
| 8,171,121 | B2* | 5/2012 | Ayyar | G06F 13/4081 709/221 |
| 8,407,701 | B2 | 3/2013 | Gaertner et al. | |
| 8,854,951 | B2* | 10/2014 | Godfrey | H04L 41/0659 370/218 |
| 2014/0025922 | A1 | 1/2014 | Heller et al. | |
| 2014/0095840 | A1 | 4/2014 | Heller | |
| 2014/0129798 | A1 | 5/2014 | Deutschle et al. | |

OTHER PUBLICATIONS

"Recovery Improvement for Quiesced Systems", U.S. Appl. No. 14/542,764, filed Nov. 17, 2014.

IBM Appendix P, list of IBM patents or patent applications treated as related, Dec. 16, 2014.

* cited by examiner

RECOVERY IMPROVEMENT FOR QUIESCED SYSTEMS

BACKGROUND OF THE INVENTION

The present invention relates generally to the field of performing a quiesce request for a computer system, and more particularly to performing a processor recovery operation during the quiesce request.

During a computing system's operation, a processor or processing core of the computing system may issue a quiesce request to the halt or suspend operation of all other processors or cores of the computing system. A processor or core issues a quiesce request when an instruction requires access to one or more resources of the computing system, where the operation requires the resource to remain unchanged or unaltered during the execution of the operation. In a multi-threaded environment, programs executing on other processors or cores may access and alter the information stored in the resource and therefore are suspended until the initiating processor of the quiesce request performs the operation which required the quiesce state. During a processor's operation, the processor or core may determine that a recovery of the processor or core is to be performed. For example, a parity error may be detected within the resources of the processor or core such as the processor or core's cache. As such, the processor performs a recovery operation to correct the detected error. The processor is unable to send or receive information to and from the computing system during recovery. Therefore, a processor or core would not receive information pertaining to the status of a quiesce state of the computing system during the processor's recovery.

SUMMARY

According to one embodiment of the present disclosure, a method for performing a quiesce operation during a processor recovery action is provided. The method includes performing, by a first processor, a processor recovery action. Retrieving, by the first processor, a quiesce status of a computer system from a shared cache with a second processor. Determining, by the first processor, a quiesce status of the first processor based, a least in part, on the retrieved quiesce status of the computer system.

According to another embodiment of the present disclosure, a computer program product for performing a quiesce operation during a processor recovery action is provided. The computer program product comprises a computer readable storage medium and program instructions stored on the computer readable storage medium. The program instructions include program instructions to perform, by a first processor, a processor recovery action. Program instructions to retrieve, by the first processor, a quiesce status of a computer system from a shared cache with a second processor. Program instructions to determine, by the first processor, a quiesce status of the first processor based, a least in part, on the retrieved quiesce status of the computer system.

According to another embodiment of the present disclosure, a computer system for performing a quiesce operation during a processor recovery action is provided. The computer system includes one or more computer processors, one or more computer readable storage media, and program instructions stored on the computer readable storage media for execution by at least one of the one or more processors. The program instructions include program instructions to perform, by a first processor, a processor recovery action. Program instructions to retrieve, by the first processor, a quiesce status of a computer system from a shared cache with a second processor. Program instructions to determine, by the first processor, a quiesce status of the first processor based, a least in part, on the retrieved quiesce status of the computer system.

DETAILED DESCRIPTION

Figure 1:
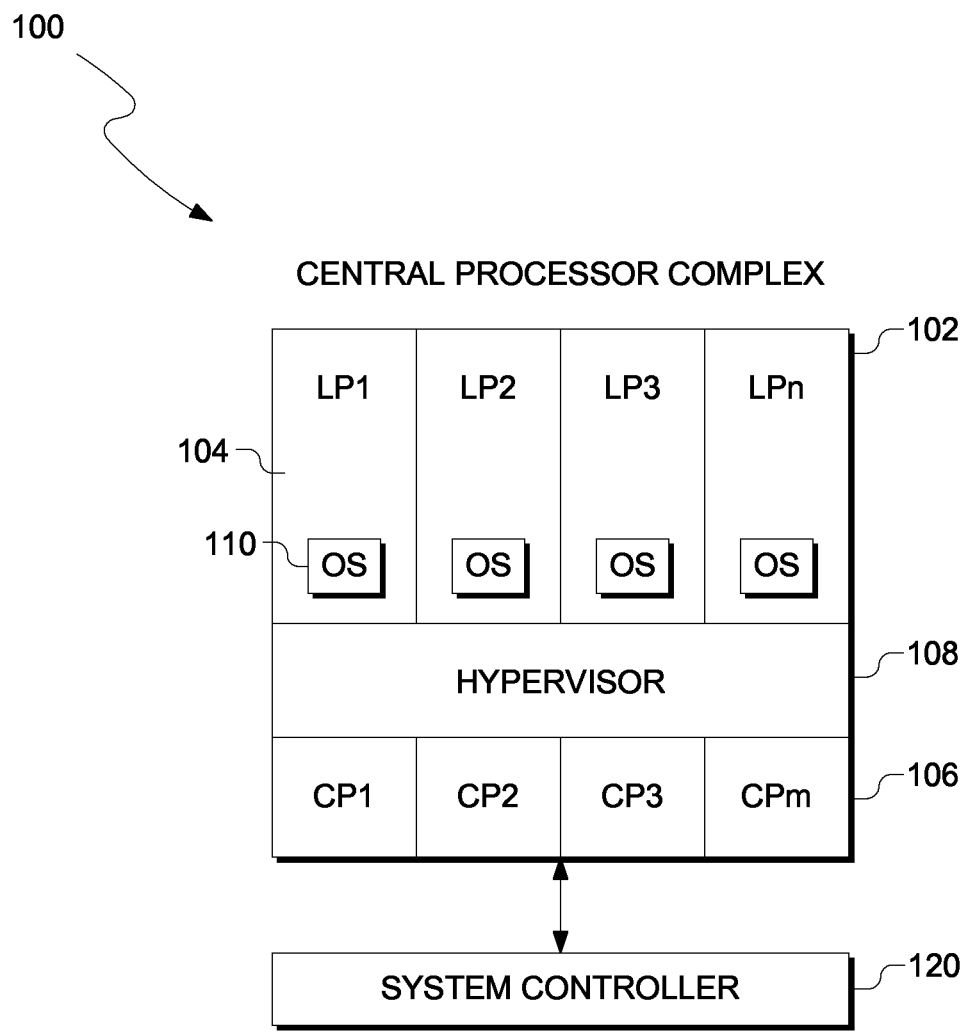
FIG. 1 depicts a computing environment, in accordance with an exemplary embodiment of the present invention.

A quiesce is the suspension of processing for a processor or processing cores of the processor. A computing system is quiesced when a group of processors or processing cores of the computing system are suspended. A processor or core sends a quiesce request to the computing system to suspend processing of the group of processors or processing cores of the computing system. A processor or core may send a quiesce request to the computing system to ensure a resource is not accessed or changed during a set of instructions or operations executed by said processor or core. A processor that sends a quiesce request is an initiating processor of the quiesce of the computing system. The computing system sends a quiesce command to the other processors based on receiving the request. The other non-initiating processors (e.g., processors that did not send a request to quiesce of the computing system) respond to the request and enter a quiesced state. The computing system keeps track of the quiesce status or state of the processors or cores during the quiesce of the system. Once the group of processors or cores respond and are quiesced, the computing system is quiesced. The computing system sends a command to the initiating processor to perform the instructions or operations that required the initial quiesce request. After the initiating processor performs said instructions or operations, the quiesce request is resolved and the computing system resumes operations for the group of processors or cores.

While known solution to processing quiesce requests are known, said solutions monitor the status of the quiesce through mechanisms provided by each processor or core of a central processing unit (CPU). Each core stores information regarding the pending quiesce requests for all cores of the CPU. During a quiesce request, a core may need to perform a recovery. Whenever a core goes through a recovery, the core cannot receive or process any new quiesce requests. As such, the core would not properly reflect the current quiesce status of the CPU. Since a quiesce happens for all cores of a CPU when a quiesce request is issued, a core with incorrect quiesce status information threatens the integrity of the CPU. Previous solutions required an elaborate and inefficient process for any core, which had gone through a recovery during a pending quiesce request, in order to maintain the integrity of the CPU.

Embodiments of the present invention recognize that by providing a system level mechanism to maintain and monitor the status of one or more quiesce requests, a core recovery will have minimal impact on the integrity of the quiesce state of a CPU. Embodiments of the present invention provide a mechanism in a level 3 (L3) cache of the CPU to maintain and monitor the status of one or more quiesce requests. When a core performs a recovery operation during a pending quiesce request, the integrity of the status of pending quiesce requests remains as the L3 cache is not part of the core's recovery. Furthermore, by maintaining the quiesce status in a central location, embodiments of the present invention provide quiesce operations with a smaller footprint within the CPU as each core does not need to store the quiesce status.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 depicts a computing environment 100, in accordance with an exemplary embodiment of the present invention. Computing environment 100 includes a central processor complex (CPC) 102 coupled to a system controller 120. Central processor complex 102 includes, for instance, one or more partitions 104 (e.g., logical partitions LP1-LPn), one or more central processors 106 (e.g., CP1-CPm), and a hypervisor 108 (e.g., a logical partition manager), each of which is described below.

Each logical partition 104 is capable of functioning as a separate system. That is, each logical partition 104 can be independently reset, initially loaded with an operating system 110, if desired, and operate with different programs. An operating system 110 or application program running in a logical partition 104 appears to have access to a full and complete system, but in reality, only a portion of it is available. A combination of hardware and Licensed Internal Code (commonly referred to as microcode or millicode) keeps a program in one logical partition from interfering with a program in a different logical partition. This allows several different logical partitions 104 to operate on a single or multiple physical processors in a time sliced manner. In this particular example, each logical partition 104 has a resident operating system 110, which may differ for one or more logical partitions 104.

Central processors 106 are physical processor resources that are allocated to the logical partitions 104. For instance, a logical partition 104 includes one or more logical processors, each of which represents all or a share of physical processor resources 106 allocated to the partition. The logical processors of a particular partition 104 may be either dedicated to the partition, so that the underlying processor resource is reserved for that partition; or shared with another partition, so that the underlying processor resource is potentially available to another partition.

Logical partitions 104 are managed by hypervisor 108 implemented by microcode running on processors 106. Logical partitions 104 and hypervisor 108 each comprise one or more programs residing in respective portions of central storage associated with the central processors 106.

System controller 120, which is coupled to the central processor complex, includes centralized logic responsible for arbitrating between different processors issuing requests. For example, when system controller 120 receives a quiesce request, it determines that the requester is the initiating processor for that request and that the other processors are receiving processors; it broadcasts messages; and otherwise, handles requests. Further details are described with reference to FIGS. 3, 5A, 5B, 6 and 7.

Figure 2:
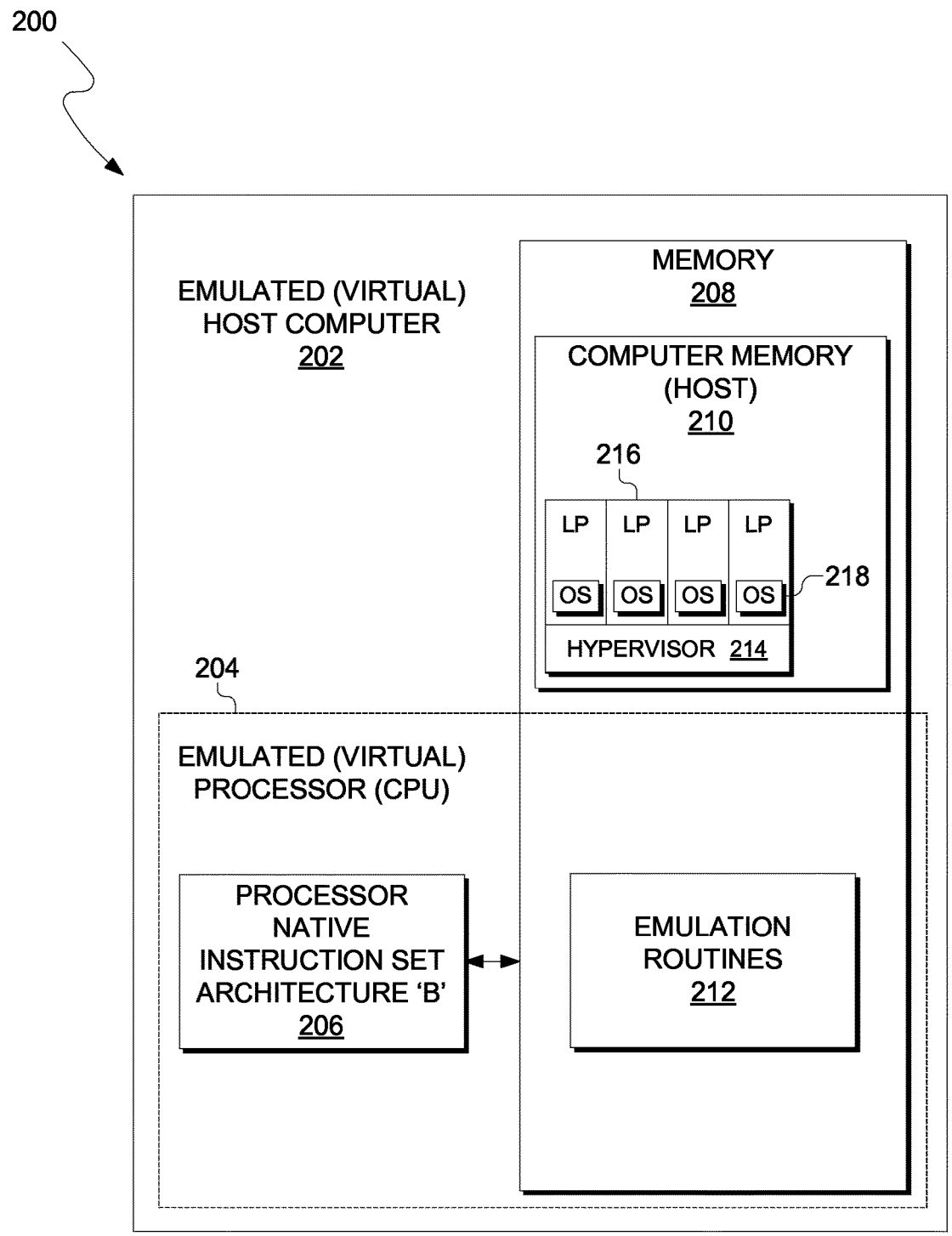
FIG. 2 depicts an emulated host computer system, in accordance with an exemplary embodiment of the present invention.

FIG. 2 depicts an emulated host computer system 200, in accordance with an exemplary embodiment of the present invention. Emulated host computer system 200 is provided that emulates a host computer system 202 of a host architecture. In emulated host computer system 200, a host processor (CPU) 204 is an emulated host processor (or virtual host processor) and includes an emulation processor 206 having a different native instruction set architecture than used by the processors of host computer 202. Emulated host computer system 200 has memory 208 accessible to emulation processor 206. In the example embodiment, memory 208 is partitioned into a host computer memory 210 portion and an emulation routines 212 portion. Host computer memory 210 is available to programs of emulated host computer 200 according to host computer architecture, and may include both a host or hypervisor 214 and one or more hypervisors 214 running logical partitions (LPs) 216 running operating systems 218, analogous to the like-named elements in FIG. 1. Emulation processor 206 executes native instructions of an architected instruction set of an architecture other than that of the emulated processor 204, the native instructions obtained from emulation routines memory 212, and may access a host instruction for execution from a program in host computer memory 210 by employing one or more instruction(s) obtained in a sequence and access/decode routine which may decode the host instruction(s) accessed to determine a native instruction execution routine for emulating the function of the host instruction accessed. One such host instruction may be, for example, processor recovery operation, by which the host recovers information of an emulated processor 204. The emulation routines 212 may include support for this instruction, and for executing a sequence of guest instructions in accordance with the definition of recovery operation.

Other facilities that are defined for host computer system 202 architecture may be emulated by architected facilities routines, including such facilities as general purpose registers, control registers, dynamic address translation, and I/O subsystem support and processor cache for example. The emulation routines may also take advantage of functions available in emulation processor 204 (such as general registers and dynamic translation of virtual addresses) to improve performance of the emulation routines. Special hardware and offload engines may also be provided to assist processor 206 in emulating the function of host computer 202.

Figure 3:
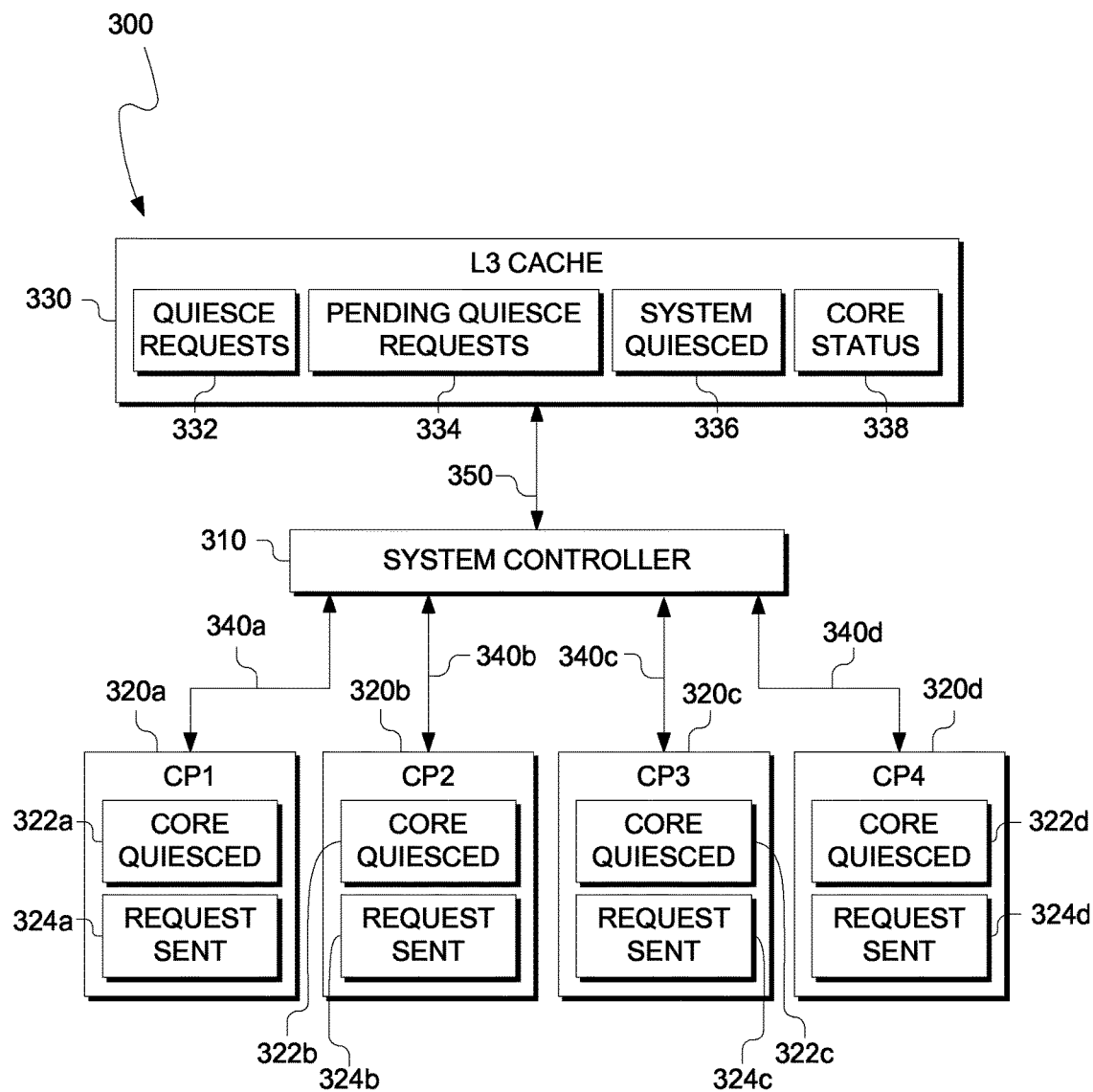
FIG. 3 depicts one embodiment of further details associated with a system controller and one or more processors of FIG. 1, in accordance with an exemplary embodiment of the present invention.

FIG. 3 depicts an example computing system, 300, of a system controller 310 coupled to processors 320a-d. In this example, four processors are depicted. However, in other embodiments, any number of processors may be coupled to system controller 310. Each processor 320a-d includes core quiesced 322 and request sent 324 data describing the quiesce status of each respective processor 320a-d. Each processor 320a-d is connected to system controller 310 via interface 340a-d. System controller 310 is coupled to L3 cache 330 via interface 350. L3 cache 330 includes quiesce requests 332, pending quiesce requests 334, system quiesced 336, and core status 338.

In various embodiments, a processor of processors 320a-d executes an instruction, series of instructions or operation requiring a quiesce of all processors 320a-d for the duration of said execution. The processor executing the operation sends a set quiesce request to system controller 310. The set quiesce request includes an identifier of the processor (e.g., 1, 2, 3 or 4 in a binary equivalent) to determine which processor that made the request. For example, processor 320a performs an operation which will access and modify a resource of the system. During this operation processor 320a requires no other processor 320b-d to access or modify said resource. Prior to execution of the operation, processor 320a sends a set quiesce request to system controller 310. A processor that sends a set quiesce request to system controller 310 is referred to as the initiating processor or initiator.

In various embodiments, an initiating processor sets data stored within the processor indicating the processor's status. Core quiesced 322a-d data indicates that the processor is in a quiesced state and is suspended from performing operations. Request sent 324a-d data indicates that the processor has sent a set quiesce request to system controller 310 to quiesce the system. For example, processor 320a requires the system to be quiesced to perform an operation. Processor 320a sends a set quiesce request to system controller 310. Processor 320a sets the request sent 324a status to indicate the request was sent. Processor 320a enters a quiesced state and set the core quiesced 322a. In some embodiments, core quiesced 322a-d and request sent 324a-d are stored as bit values to represent, respectively, the state of the processor and if the set quiesce request was sent. In one embodiment, core quiesced 322a-d is equal to "1" when a respective processor 320a-d is quiesced and "0" when processor the respective processor is not quiesced. In another embodiment, request sent 324a-d is equal to "1" until the respective processor 320a-d sends a set quiesce request to system controller 310 and set to "0" when the request is sent. In this embodiment, during a recovery operation processors 320a-d will not reset the respective request sent 324a-d bit. By not resetting the bit during recovery, the respective processor 320a-d determines if a previous request was sent prior to recovery.

In various embodiments, system controller 310 includes various controls to receive and process incoming set quiesce requests from processors 320a-d via interfaces 340a-d. For example, one or more processor of processors 320a-d sends a set quiesce request to system controller 310. System controller 310 determines the initiating processor of the request and updates the quiesce status information stored in L3 cache 330 (i.e., quiesce requests 332, pending quiesce requests 334, system quiesced 336 and core status 338) via interface 350. As discussed in further detail in the foregoing disclosure, by storing the quiesce status information in L3 cache 330, computing system 300 maintains a correct status of the quiesce states of processors 320a-d, particularly when a processor of processors 320a-d performs a recovery operation.

In various embodiments, system controller 310 sends enter quiesce operation to processors 320a-d in response to receiving and processing a quiesce request from an initiating processor. Each processor of processor 320a-d receives a quiesce interrupt operation and will continue operation until the respective processor of processors 320a-d is at an interruptible point of execution. Once a processor of processors 320a-d reaches an interruptible point, the respective processor sends a quiesce interrupt response to system controller 310. The responding processor includes in the quiesce interrupt response an identifier representative of the responding processor of processors 320a-d. Furthermore, the responding processor sets the respective core quiesced 322a-d status to indicate the processor is quiesced. In response to receiving a quiesce response, system controller 310 updates quiesce status information stored in L3 cache 330 to reflect the respective processors quiesced state.

In various embodiments, system controller 310 receives responses, including the initiating processors and all other processors (e.g., non-initiating processors), from all processors 320a-d and determines computing system 300 is quiesced, setting the system quiesced 336 status to '1'. System controller 310 updates the quiesce status information stored in L3 cache 330 to indicate that computing system 300 is in a quiesced state (e.g., each processor 320a-d is suspended from operation) via system quiesced 336. Based on the determination that computing system is in a quiesced state, system controller 310 determines the priority of one or more initiating processors 320a-d. System controller 310 sends an operation to the initiating processor with the highest priority to perform the instruction or operation that required the set quiesce request to be sent. Once the initiating processor performs the instruction or operation, the initiating processor sends a reset quiesce operation to system controller 310. System controller 310 updates quiesce status information stored in L3 cache 330.

In various embodiments, L3 cache 330 includes quiesce status information describing the pending quiesce requests, the priority of the pending quiesce requests, the quiesce status of computing system 300 and the quiesce status of processors 320a-d. Quiesce requests 332 status information includes an indication of each processor of processors 320a-d which initiated a quiesce request. In an embodiment, L3 cache 330 has a separate controller (not shown) and is connected via separate interfaces (not shown) to processors 320a-d. In some embodiments, all or some portion of L3 cache 330 is error-correcting code (ECC) protected. For example, if a parity check determines an error is detected in the data stored in L3 cache 330 then the ECC protection can correct the error thereby ensuring the correctness of the data stored in L3 cache 330. In some embodiments, quiesce requests 332 is stored in L3 cache as a vector. The vector includes one bit sized elements is has a dimension equal to the number of processors in computing system 300. Each element corresponds to a processor and is set when system controller 310 receives a set quiesce request from a corresponding processor. For example, receipt of a quiesce request from processor 320a is stored in the first position of the vector, a request from processor 320b in the second position, a request from processor 320c in the third potion and a request from processor 320d in the fourth position of the vector. Quiesce requests 332 accumulates all received set quiesce requests until the system is quiesced. For example, processor 320a sends a set quiesce request to system controller 310 with an identifier (e.g., '00') of the processor. System controller 310 sets the corresponding bit of the vector to one for the bit assigned to processor 320a (e.g., the priority vector equals '1000'). During the process of quiescing computing system 300, system controller 310 receives another quiesce request from processor 320c, with identifier '10'. System controller 310 sets the corresponding bit of the vector reflecting all received quiesced requests (e.g., '1010'). In another embodiment, quiesce requests 332 is stored as a stack. For example, the identifier of an initiating processor of processors 320a-d is stored in a memory location of L3 cache 330 as indicated by a pointer address. With each received request, system controller 310 increments the pointer to the next memory address of the stack. Using the example where processor 320a sends a quiesce request followed by processor 320c, the stack would have two identifiers starting with '00' and ending with '10' and a length of two.

In various embodiments, system controller 310 sends commands or operations to initiating processors 320a-d to perform the operations or instructions that required the system to be quiesced. System controller 310 determines a priority of the quiesce requests. System controller 310 sends commands to the initiating processors in an order based on the determined priority. In embodiments where a vector is used to store the quiesce priority, system controller 310 sends commands to perform the operations requiring the quiesce request to the left most bit of the vector that is set. For example, if the vector is '0101' then system controller 310 will first send commands to processor 320b to perform the operations requiring the quiesce request. Once system controller 310 receives a response from processor 320b indicating the operations requiring the quiesce request have been performed, system controller 310 then sends a second command to processor 320d to perform the operations requiring the quiesce request. As another example, system controller 310 determines priority based on the right most bit of the vector that is equal to one. For embodiments where quiesce requests 332 is stored as a stack, system controller 310 performs a 'pop' operation of the stack to retrieve an identifier to determine the processor which the command is sent to. For example, the stack is implemented as First-In-First-Out stack (FIFO). The processor that sent the first request received by system controller 310 is given priority. System controller 310 removes the identifier from the stack and 'pushes' any remaining requests to the top of the stack, thereby allowing processors 320a-d to perform the operations requiring the quiesce state to be executed in order as received by system controller 310.

In various embodiments, after a processor of processors 320a-d performs the operations or instructions, the respective processor sends a reset operation to system controller 310. In embodiments where quiesce requests 332 is a vector, system controller 310 sets the corresponding bit of the vector to zero when it receives a resets operation from the respective processor of processors 320a-d. In embodiments where quiesce requests 332 is a stack, system controller 310 removes the identifier from the stack and 'pushes' any remaining requests to the top of the stack. In various embodiments, the initiating processor sets the request sent 324a-d status for the respective initiating processor, indicating the quiesce request was acknowledged and completed for that processor. Once all pending quiesce requests are resolved, system controller 310 resets the status of the system's quiesce state (system quiesced 336) and processors 320a-d resume operation.

In various embodiments, pending quiesce requests 334 status information is a status bit that indicates if any pending quiesce requests are present. In embodiments where quiesce requests 332 is a vector, pending quiesce requests 334 is determined by performing an OR operation across all bits of the vector. If a pending request is stored in the vector, then pending quiesce requests 334 will be set to '1'. In embodiments where quiesce requests 332 is a stack, the length of the stack is determined. If the stack is a length greater than zero then pending quiesce requests 334 will be set to '1'. In various embodiments, system quiesced 336 status information indicates if all processors 320a-d, including initiating processors and non-initiating processors, are quiesced. Once all non-initiating processors have responded to quiesce interrupt command, system controller 310 sets the systems quiesced 336 status to '1'. For example, system controller 310 sets system quiesced 336 when all processors 320a-d have set their respective core quiesced 322a-d bits. In various embodiments, core status 338 stores the quiesce status of all processors 320a-d, equivalent to the respective core quiesced 322a-d status of the respective processors. Core status 338 also stores information if a processor of processor 320a-d was quiesced before or after a recovery operation. For example, if a processor performs a recovery after sending a response to a quiesce interrupt command to system controller 310, then system controller 310 will set a bit in core status 338 to indicate that the processor has performed a recovery operation during the quiesce operation.

Figure 4:
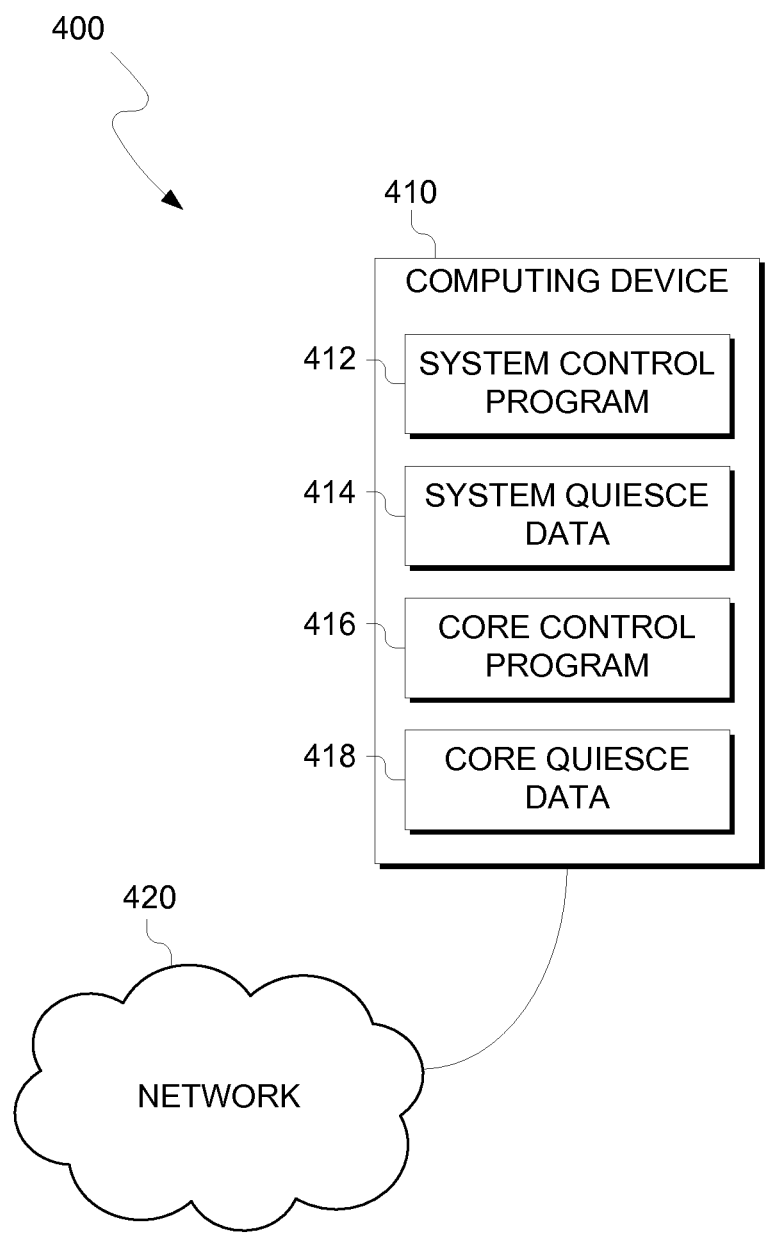
FIG. 4 depicts further details associated with an emulated computing environment of FIG. 2, in accordance with an exemplary embodiment of the present invention.

FIG. 4 is a functional block diagram illustrating emulated computing environment, generally designated 400, in accordance with an exemplary embodiment of the present invention. Emulated computing environment 400 includes computing device 410 connected over network 420. Computing device 410 includes system control program 412, system quiesce data 414, core control program 416 and core quiesce data 418.

In various embodiments of the present invention, computing device 410 is a computing device that can be a standalone device, a server, a laptop computer, a tablet computer, a netbook computer, a personal computer (PC), or a desktop computer. In another embodiment, computing device 410 represents a computing system utilizing clustered computers and components to act as a single pool of seamless resources. In general, computing device 410 can be any computing device or a combination of devices with access to system quiesce data 414 and core quiesce data 418 and is capable of executing system control program 412 and core control program 416. Computing device 410 may include internal and external hardware components, as depicted and described in further detail with respect to FIG. 8.

In this exemplary embodiment, system control program 412, system quiesce data 414, core control program 416 and core quiesce data 418 are stored on computing device 410. However, in other embodiments, system control program 412, system quiesce data 414, core control program 416 and core quiesce data 418 may be stored externally and accessed through a communication network, such as network 420. Network 420 can be, for example, a local area network (LAN), a wide area network (WAN) such as the Internet, or a combination of the two, and may include wired, wireless, fiber optic or any other connection known in the art. In general, network 420 can be any combination of connections and protocols that will support communications between computing device 410 and other devices (not shown) of network 420, in accordance with a desired embodiment of the present invention.

In exemplary embodiments, system control program 412 provides emulation routines 212 to perform emulated operations of system controller 310. Core control program 416 provides emulation routines 212 to perform emulated operation of one or more processors 320a-d. System quiesce data 414 stores status information of the system quiesce status. Core quiesce data 418 stores status information of one or more processors quiesce status.

In various embodiments, system control program 412 receives set and rest quiesce requests from one or more instances of core control program 416. System control program 412 updates system quiesce data based on received set and reset quiesce requests. System control program 412 sends and receives quiesce response operations to one or more instances of core control program 416. System control program 412 updates system quiesce data based on received quiesce responses.

In various embodiments, core control program 416 performs program instructions and operations for one or more emulated programs of emulated host computer 200. Core control program 416 sends set and rest quiesce requests from one or more emulated programs to system control program 412. Core control program 416 sends and receives quiesce responses from one or more emulated programs to system control program 412. Core control program 416 performs recovery operation for one or more emulated programs.

In various embodiments, system quiesce data 414 stores various status information for the quiesced state of emulated host computer 200. For example, system quiesce data 414 stores information for received quiesce requests, pending quiesce request, the emulated host computers quiesced state, and the quiesced state of one or more emulated processors 204. Core quiesce data 418 stores various status information for one or more emulated processors 204. For example, core quiesce data 418 stores information about the quiesced state of a emulated processor 204 and the status of a quiesce request of a emulated processor 204.

Figure 5A:
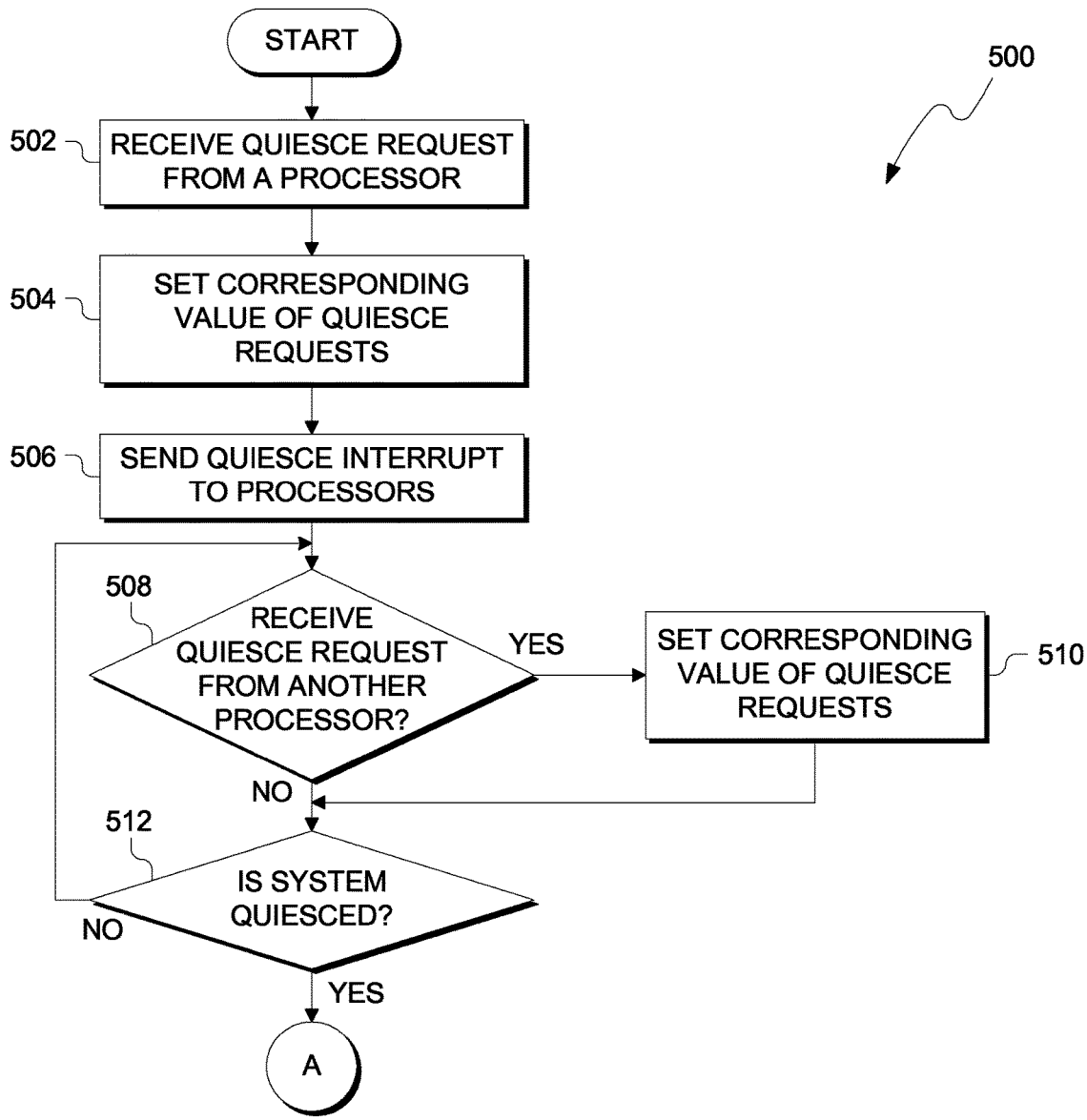
FIGS. 5A-5B depicts quiesce request processing at a system controller of a computing system of FIG. 3, in accordance with an exemplary embodiment of the present invention.
Figure 5B:
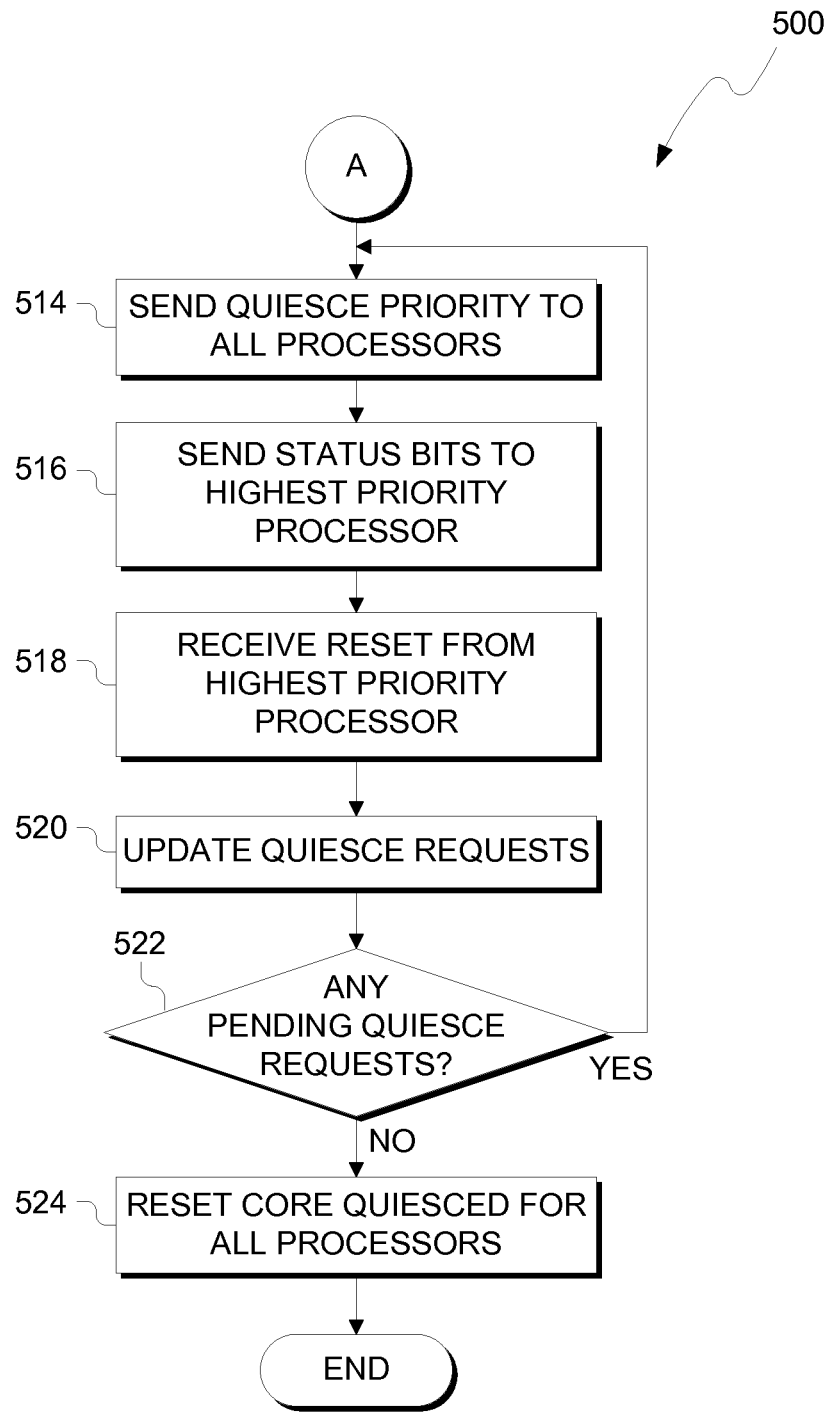

FIGS. 5A & 5B depicts a process, 500, of system controller 310 receiving quiesce requests and quiescing computing system 300, in accordance with an exemplary embodiment of the present invention. In process 502, system controller 310 receives a quiesce request from a processor core of processors 320a-d. The request includes an instruction to set quiesce requests 332 for the initiating processor in addition to an identifier for said initiating processor. In response to receiving a quiesce request, system controller 310 sets the corresponding value associated with the initiating processor, as indicated by the identifier of the request, to indicate that a quiesce request was received and is pending in computing system 300 (process 504). For example, quiesce requests 332 is stored as a vector. The vector has a bit value for each processor 320a-d of computing system 300. System controller 310 sets the corresponding bit value associated with a processor in the vector when a quiesce request is received.

In process 506, system controller 310 sends a quiesce interrupt command to all processing cores of computing system 300. During process 506 and until the system is quiesced (process 512), system controller 310 may receive other quiesce requests from another processor of processors 320a-d than the initial initiating processors (i.e., the processor that sent the request in process 502). In process 508, system controller 310 determines if any new requests have been received. If a quiesce request is received by system controller 310 (YES branch of process 508), then system controller 310 will update quiesce requests 332 to indicate quiesce request was received and is pending in computing system 300 (process 510). If no quiesce requests are received by system controller 310 (NO branch of process 508), then system controller 310 determines if computing system 310 is quiesced.

In process 512, system controller 310 determines if computing system 300 is quiesced. Computing system 300 is quiesced when all processors 320a-d have reached an interruptible point it in execution of a current thread or set of instructions. Processors 320a-d respond to the quiesce interrupt command sent in process 506 by sending a quiesce interrupt response to system controller 310. The quiesce interrupt response includes an identifier of the responding processor 320a-d. System controller 310 receives the quiesce interrupt responses from processors 320a-d. System controller 310 sets system quiesced 336 status information in L3 cache when all processors have sent a response. If computing system 300 is not quiesced and one or more processors 320a-d have not responded to the quiesce interrupt command sent in process 508 (NO branch of process 512), then system controller 310 waits for the quiesce interrupt responses to be received from all processors 320a-d (process 512). System controller 310 may receive and process any quiesce requests (processes 508 and 510) until all processors 320a-d have responded to the quiesce interrupt command. If computing system 300 is quiesced (YES branch of process 512), the system controller 310 will proceed with processing the pending quiesce requests for the one or more processors 320a-d received in processes 502 and 508.

In process 514, system controller 310 sends the quiesce priority to all processing cores of processors 320a-d. System controller 310 sends the vector stored in to quiesce requests 332. The processor associated with the left most position of the vector which is set (i.e., equal to '1') is given priority to perform the operations or instructions which required the quiesce request to be originally sent (e.g., processes 502 and 508). In other embodiments, system controller 310 sends a command with the identifier of the highest priority processor to all processors 320a-d. In some embodiments, system controller 310 sends additional status information stored in L3 cache 330 (process 516). For example, system controller 310 sends system quiesced 336 and/or core status 338 for other processors (e.g. core quiesced 322a-d, request sent 324a-d, if a processor has performed a recovery operation before or after a quiesce request).

In process 518, the processor of processors 320a-d with the highest priority performs the operations that required the quiesce request to be sent. The processor sends a reset quiesce request to system controller 310 including an identifier of the processor. System controller 310 receives the reset quiesce request for the processor, and based on the identifier, updates the corresponding value of quiesce requests 332 by resetting the corresponding value to '0' (process 520). System controller 310 determines if any pending quiesce requests are present (process 522). System controller 310 evaluates pending quiesce requests 334. If pending quiesce requests 334 indicates that additional quiesce requests are pending (YES branch of process 522), then system controller 310 sends the updated quiesce requests 332 to all processors 320a-d. System controller 310 continues the above processes 514-522 until all pending quiesce requests 334 are resolved by the initiating processors. If pending quiesce requests 334 indicates that no quiesce request are pending (NO branch of process 522), system controller 310 sends a reset core quiesced command to all processors 320a-d (process 524). Processors 320a-d reset the respective core quiesced 322a-d status and system quiesced 336 status information stored in L3 cache 330 is reset.

Figure 6:
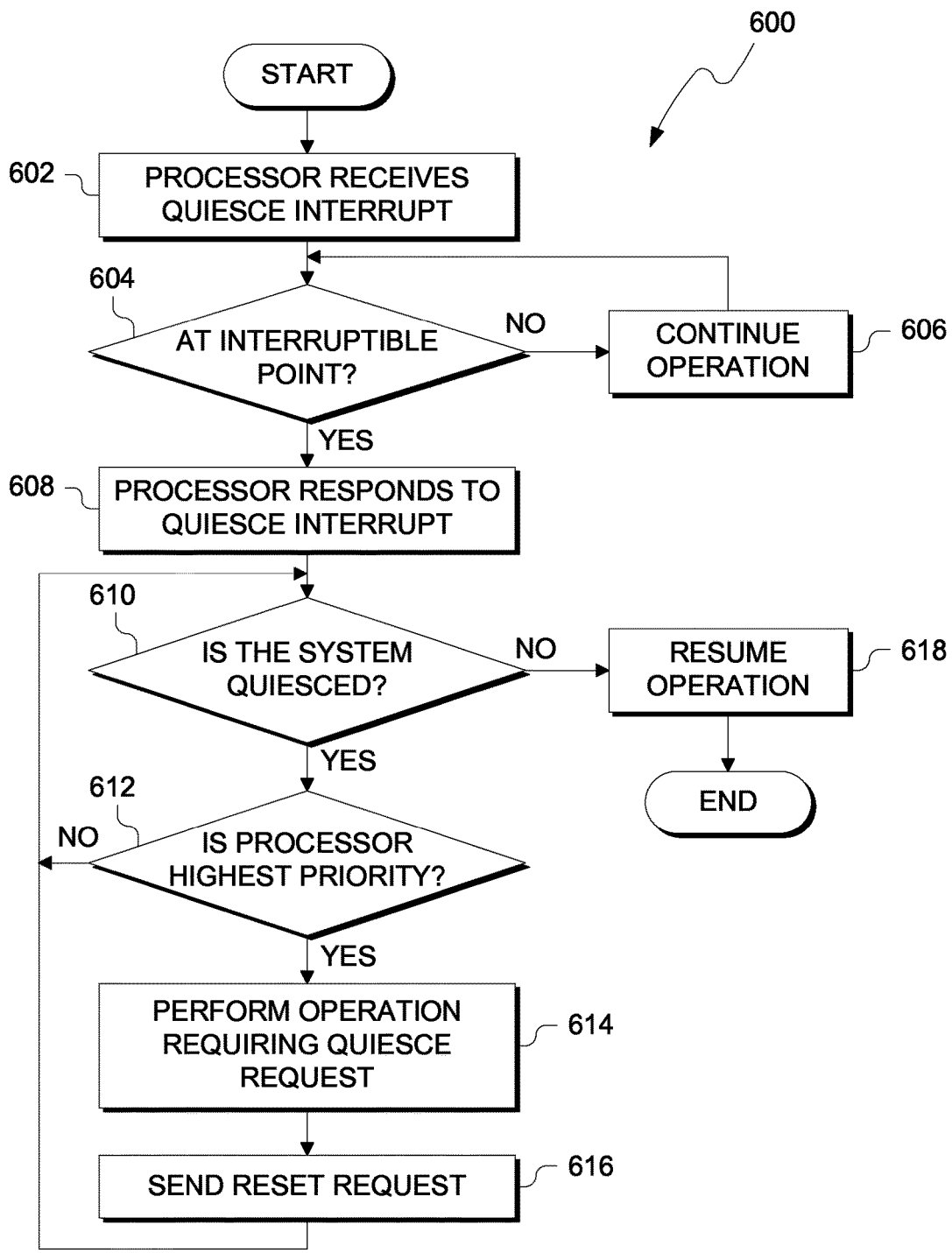
FIG. 6 depicts quiesce interrupt processing at a processor of a computing system of FIG. 3, in accordance with an exemplary embodiment of the present invention.

FIG. 6 depicts a process, 600, of quiesce interrupt processing at a processor of processors 320a-d of computing system 300, in accordance with an exemplary embodiment of the present invention. In process 602, a processor of processors 320a-d receives a quiesce interrupt command from system controller 310. The processor determines if the instructions of a thread currently executing on the processor is at an interruptible point (process 604). If the processor is not at an interruptible point (NO branch of process 604), then the processor continues operation of the thread (process 606). If the If the processor is not at an interruptible point (YES branch of process 604), then the processor enters a quiesced state and suspends operation of the current thread. In process 608, the processor responds to the interrupt command sent by system controller 310. The processor sends an identifier of said processor along with the response.

The processor sets the respective core quiesced 322a-d status to '1' of the processor.

In process 610, the processor determines if the system is quiesced. The processor receives quiesce requests 332 from system controller 310. If system quiesced 336 is set (YES branch of process 610), then the processor receives quiesce requests 332 from system controller 310. In some embodiments, the processor retrieves quiesce requests 332 from L3 cache 330 or sends a request to system controller 310 for quiesce requests 332. In process 612, the processor determines if said processor has priority in the quiesce requests that are pending based on quiesce requests 332. If the processor does not have priority (NO branch of 612), then the processor determines if the system is quiesced (process 610). A non-initiating processor (e.g., a processor without a pending quiesce request) continues to monitor the status of system's quiesce until the system is no longer quiesced. Once the system is not quiesced (NO branch of process 610), the processor resumes operation and resets the respective core quiesced 322a-d (process 618).

For initiating processors, the processor waits until quiesce requests 332 indicates that the processor has priority (YES branch of process 612). When an initiating processor receives priority, the processor performs the operations or instruction which required a quiesce request to be sent (process 614). The processor sends a reset quiesce request to system controller 310. The reset request includes the identifier for the processor. System controller 310 updates quiesce requests 332 be resting the respective value associated with the processor. The processor remains in a quiesced state until the system in not quiesced (process 610). Once the system is not quiesced (NO branch of process 610), the processor resumes operation and resets the respective core quiesced 322a-d (process 618).

Figure 7:
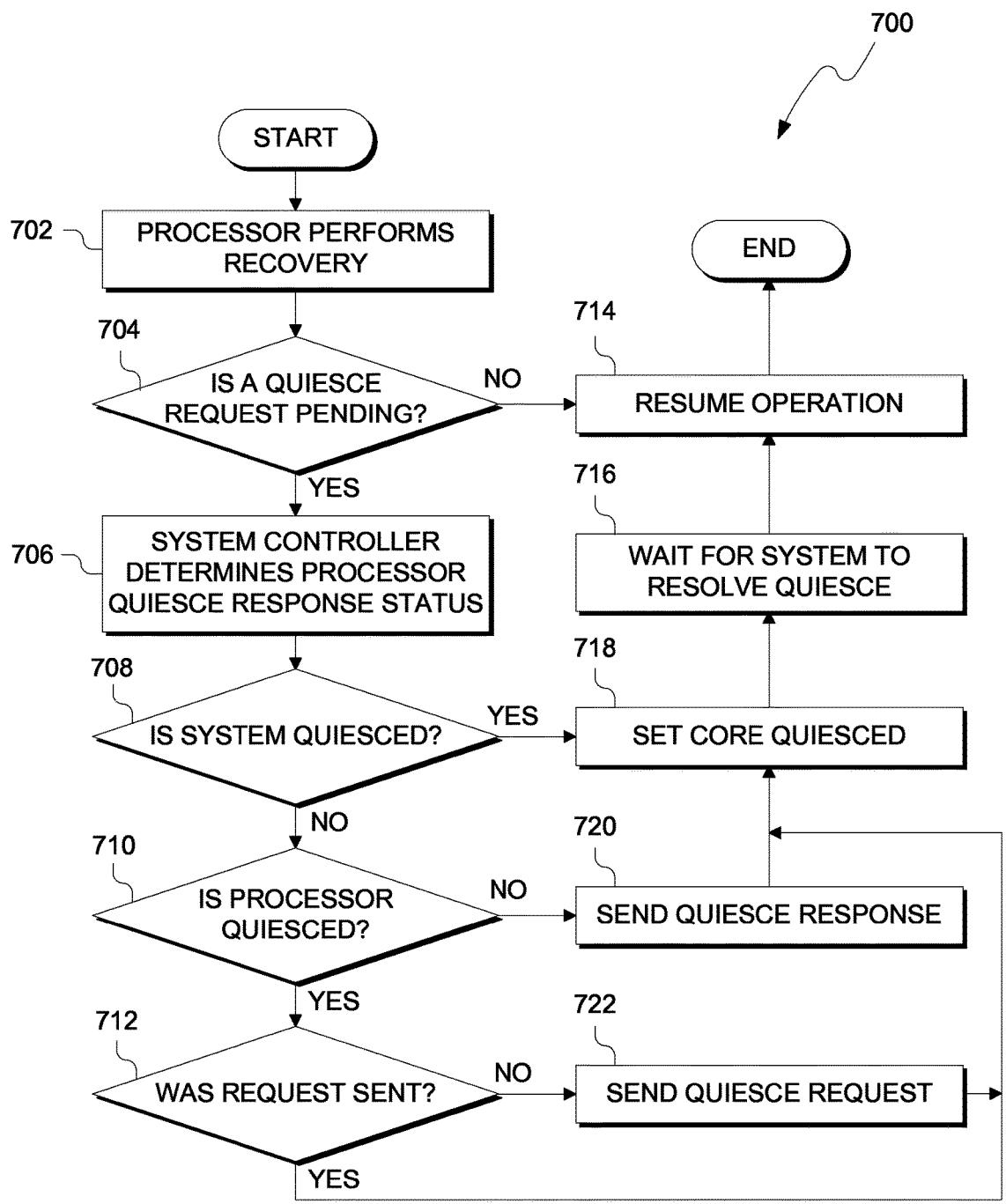
FIG. 7 depicts recovery with a pending quiesce request at a processor of a computing system of FIG. 3, in accordance with an exemplary embodiment of the present invention.

FIG. 7 depicts a process, 700, of a processor 320 performing recovery with a pending quiesce request in a computing system 300, in accordance with an exemplary embodiment of the present invention. In process 702, a processor 320 performs a recovery operation. For example, processor 320 determines that data stored on a local level cache (e.g. a L1 cache) is incorrect. Processor 320 performs a recovery operation to correct the portion of the data detected to be incorrect. During the recovery operation, processor 320 is fenced (e.g., isolated) from computing system 300. When performing a recovery operation, processor 320 does not receive any incoming information from system controller 310 regarding the status of a any pending quiesce requests as discussed in FIGS. 5A, 5B and 6 above. By storing quiesce information in L3 cache 330, processor 320 determines the status of the quiesced state of computing system 300 after the recovery operation is finished. Processor 320 sends an instruction to system controller 310 indicating that a recovery operation is being performed.

In process 704, processor 320 determines if any quiesce requests are pending in computing system 300. Processor 320 sends an operation to system controller 310 to retrieve pending quiesce requests 334 from L3 cache 330. If no pending quiesce requests are present in computing system 300 (NO branch of process 704), then processor 320 resumes operation (process 714). If pending quiesce requests are pending in computing system 300 (YES branch), then system controller 310 determines the quiesce request status of the processor (process 706). In process 706, system controller 310 determines the quiesce response status for the processor performing the recovery operation. System controller 310 determines if a quiesce response was sent from processor 320 prior to the recovery operation. If core status 338 indicates the respective processor 320 has responded prior to the recovery operation, then system controller 310 keeps the current value of system quiesced 336. If core status 338 indicates the corresponding processor 320 has not responded prior to the recovery operation, system controller 310 resets system quiesced 336 to '0'.

In process 708, processor 320 determines if the system is quiesced. Processor 320 sends an operation to system controller 310 to send the current value of system quiesced 336 from L3 cache 330. If system quiesced 336 is set (YES branch of process 708), then processor 320 enters a quiesce state (process 718). Processor 320 sets the respective core quiesced 322 status and sends a quiesce response to system controller 310. After entering a quiesced state, processor 320 waits until system quiesced 336 is reset by system controller 310 once all pending quiesce requests are resolved (process 716). If system quiesced is not set (NO branch of process 708), then processor 320 determines if the processor is quiesced (process 710).

In process 710, processor 320 determines if the respective core quiesced 322 is set. If core quiesced 322 is not set (NO branch of process 710), then processor 320 sends a quiesce response to system controller 310 (process 720). Processor 320 then enters a quiesced state and sets the respective core quiesced 322 status to '1'. If core quiesced is set (YES branch of process 710), then processor 320 determines if a quiesce request was sent (process 712). In process 712, processor 320 determines if a quiesce request was sent. If request sent 324 for the respective processor is set to indicate a quiesce request was not sent (NO branch of process 712), then processor 320 sends a new quiesce request to system controller 310 (process 722). If request sent 324 for the respective processor is not set to indicate a quiesce request was sent (YES branch of process 712), then processor 320 enters a quiesced state and set the respective core quiesced 322 (process 718), waits for the quiesce request to be resolved (process 716) until resuming operation (process 714).

Figure 8:
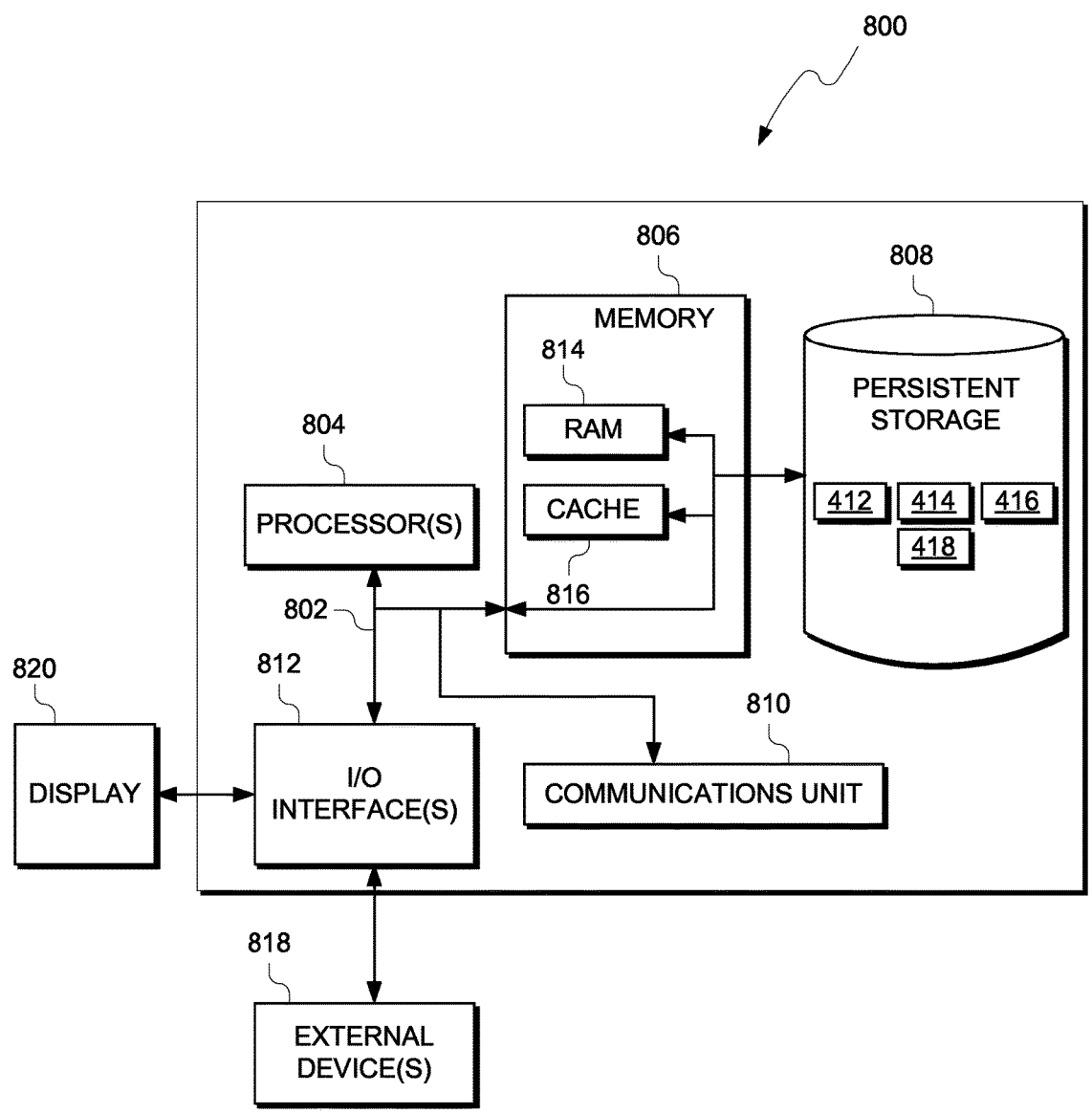
FIG. 8 depicts a block diagram of components of the computing device executing an emulated computing environment, in accordance with an exemplary embodiment of the present invention.

FIG. 8 depicts a block diagram, 800, of components of computing device 410, in accordance with an exemplary embodiment of the present invention. It should be appreciated that FIG. 8 provides only an illustration of one implementation and does not imply any limitations with regard to the environments in which different embodiments may be implemented. Many modifications to the depicted environment may be made.

Computing device 410 includes communications fabric 802, which provides communications between computer processor(s) 804, memory 806, persistent storage 808, communications unit 810, and input/output (I/O) interface(s) 812. Communications fabric 802 can be implemented with any architecture designed for passing data and/or control information between processors (such as microprocessors, communications and network processors, etc.), system memory, peripheral devices, and any other hardware components within a system. For example, communications fabric 802 can be implemented with one or more buses.

Memory 806 and persistent storage 808 are computer-readable storage media. In this embodiment, memory 806 includes random access memory (RAM) 814 and cache memory 816. In general, memory 806 can include any suitable volatile or non-volatile computer-readable storage media.

System control program 412, system quiesce data 414, core control program 416 and core quiesce data 418 are stored in persistent storage 808 for execution and/or access by one or more of the respective computer processors 804 via one or more memories of memory 806. In this embodiment, persistent storage 808 includes a magnetic hard disk drive. Alternatively, or in addition to a magnetic hard disk drive, persistent storage 808 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 808 may also be removable. For example, a removable hard drive may be used for persistent storage 808. Other examples include optical and magnetic disks, thumb drives, and smart cards that are inserted into a drive for transfer onto another computer-readable storage medium that is also part of persistent storage 808.

Communications unit 810, in these examples, provides for communications with other data processing systems or devices, including resources of network 420. In these examples, communications unit 810 includes one or more network interface cards. Communications unit 810 may provide communications through the use of either or both physical and wireless communications links. System control program 412, system quiesce data 414, core control program 416 and core quiesce data 418 may be downloaded to persistent storage 808 through communications unit 810.

I/O interface(s) 812 allows for input and output of data with other devices that may be connected to computing device 810. For example, I/O interface 812 may provide a connection to external devices 818 such as a keyboard, keypad, a touch screen, and/or some other suitable input device. External devices 818 can also include portable computer-readable storage media such as, for example, thumb drives, portable optical or magnetic disks, and memory cards. Software and data used to practice embodiments of the present invention, e.g., system control program 412, system quiesce data 416, core control program 416 and core quiesced data 418, can be stored on such portable computer-readable storage media and can be loaded onto persistent storage 808 via I/O interface(s) 812. I/O interface(s) 812 also connect to a display 820.

Display 820 provides a mechanism to display data to a user and may be, for example, a computer monitor, or a television screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) "Smalltalk" and the like may be subject to trademark rights in various jurisdictions throughout the world and are used here only in reference to the products or services properly denominated by the marks to the extent that such trademark rights may exist.

What is claimed is:

1. A method for performing a quiesce operation during a processor recovery action, the method comprising:
    performing, by a first processor, a processor recovery action;
    retrieving, by the first processor, a quiesce status of a computer system from a shared cache with a second processor; and
    determining, by the first processor, a quiesce status of the first processor based, at least in part, on the retrieved quiesce status of the computer system.

2. The method of claim 1, wherein the shared cache is a L3 cache of the computer system.

3. The method of claim 2, wherein the quiesce status of the computer system is protected with an error-correcting code.

4. The method of claim 1, the method further comprising:
    receiving, by the computer system, a quiesce request from a second processor, wherein the quiesce request is for one or more instruction requiring the computer system to be quiesced;
    updating, by the computer system, the quiesce status of the computer system in response to the received quiesce request from the second processor; and
    sending, by the computer system, the quiesce status of the computer system to at least the first processor.

5. The method of claim 4, the method further comprising:
    receiving, by the first processor, the quiesce status of the computer system;
    determining, by the first processor, a response to the quiesce request of the second processor; and
    sending, by the first processor, the response to the computer system.

6. The method of claim 5, the method further comprising:
    updating, by the computer system, the quiesce status of the computer system based on the response of the first processor, wherein the response of the first processor includes a quiesce request from the first processor.

7. The method of claim 6, the method further comprising:
    determining, by the computer system, a priority of the quiesce requests of the first processor and second processor; and
    sending, by the computer system, the determined priority to the first processor and the second processor.

* * * * *